(12) United States Patent
Chien et al.

(10) Patent No.: US 12,154,348 B2
(45) Date of Patent: Nov. 26, 2024

(54) METHOD FOR DETECTING ROAD CONDITIONS AND ELECTRONIC DEVICE

(71) Applicant: HON HAI PRECISION INDUSTRY CO., LTD., New Taipei (TW)

(72) Inventors: Shih-Chao Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 412 days.

(21) Appl. No.: 17/846,232

(22) Filed: Jun. 22, 2022

(65) Prior Publication Data

US 2023/0386221 A1 Nov. 30, 2023

(30) Foreign Application Priority Data

May 31, 2022 (CN) .......................... 202210613596.7

(51) Int. Cl.
- *B60W 40/06* (2012.01)
- *G06F 18/214* (2023.01)
- *G06V 20/58* (2022.01)

(52) U.S. Cl.
CPC .............. *G06V 20/58* (2022.01); *B60W 40/06* (2013.01); *G06F 18/214* (2023.01); *B60W 2420/403* (2013.01); *B60W 2552/40* (2020.02)

(58) Field of Classification Search
CPC ...... G06V 20/58; G06V 10/26; G06V 20/588; G06V 10/82; B60W 40/06; B60W 2420/403; B60W 2552/40; G06F 18/214; Y02T 10/40
See application file for complete search history.

(56) References Cited

U.S. PATENT DOCUMENTS

| | | | |
|---|---|---|---|
| 2022/0027688 A1* | 1/2022 | Osanai | G06F 18/2148 |
| 2023/0177695 A1* | 6/2023 | Zhang | G06V 10/454 |
| | | | 382/159 |

FOREIGN PATENT DOCUMENTS

| | | |
|---|---|---|
| CN | 114418895 | 4/2022 |
| CN | 114492732 | 5/2022 |

* cited by examiner

*Primary Examiner* — Chuong A Ngo
(74) *Attorney, Agent, or Firm* — ScienBiziP, P.C.

(57) ABSTRACT

A method for detecting road conditions applied in an electronic device obtains images of a scene in front of a vehicle, and inputs the images into a trained semantic segmentation model. The electronic device inputs the images into a backbone network for feature extraction and obtains a plurality of feature maps, inputs the feature maps into the head network, processes the feature maps by a first segmentation network of the head network, and outputs a first recognition result. The electronic device further processes the feature maps by a second segmentation network of the head network, and outputs a second recognition result, and determines whether the vehicle can continue to drive on safely according to the first recognition result and the second recognition result.

20 Claims, 5 Drawing Sheets

METHOD FOR DETECTING ROAD CONDITIONS AND ELECTRONIC DEVICE

This application claims priority to Chinese Patent Application No. 202210613596.7 filed on May 31, 2022, in China National Intellectual Property Administration, the contents of which are incorporated by reference herein.

FIELD

The subject matter herein generally relates to a field of road safety, in particular, relates to a method for detecting road conditions and an electronic device.

BACKGROUND

In an autonomous driving of vehicles, environmental awareness is extremely important. In prior art, most of the functions of environment awareness in AI are achieved by semantic segmentation methods based on deep learning. The semantic segmentation methods use deep learning segmentation models to identify objects in images. However, the above methods can only identify pre-defined objects, such as pre-defined categories of roads, pedestrians, vehicles, etc. However, scenes on the road can be extremely complex in practical application. If an unknown object appears on the road scene, the trained models often misidentify or fail to identify, causing a possibility of an accident if a vehicle hits or drives over the unknown object.

BRIEF DESCRIPTION OF THE DRAWINGS

Implementations of the present disclosure will now be described, by way of embodiment, with reference to the attached figures.

DETAILED DESCRIPTION

Figure 1:
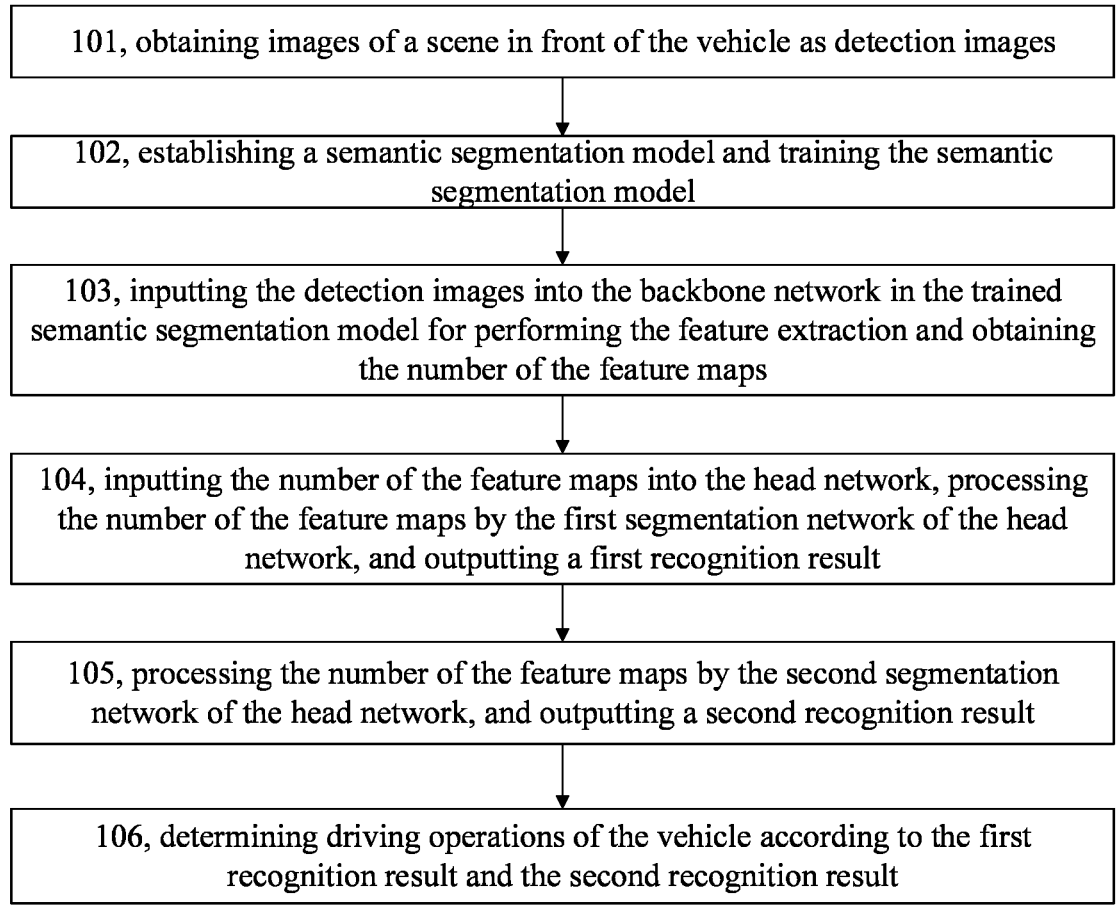
FIG. 1 is a flowchart of one embodiment of a method for detecting road conditions according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a method for detecting road conditions. The method is applied in an electronic device (referring to FIG. 5). The electronic device can be any electronic product that can interact with a user, such as a personal computer, a tablet computer, a smart phone, a Personal Digital Assistant (PDA), a game console, an Internet Protocol Television (IPTV), a smart wearable device, etc.

The electronic device is a device that can automatically perform numerical calculation and/or information processing according to pre-set or stored instructions, and its hardware includes, but is not limited to, a microprocessor, an Application Specific Integrated Circuit (ASIC), a Field-Programmable Gate Array (FPGA), a Digital Signal Processor (DSP), an embedded device, etc.

In one embodiment, the electronic device may also include a network device and/or a user device. The network device includes, but is not limited to, a single network server, a server group consisting of multiple network servers, or a cloud server consisting of a large number of hosts or network servers.

A network connected to the electronic device includes, but is not limited to, the Internet, a wide area network, a metropolitan area network, a local area network, a Virtual Private Network (VPN), etc.

The method for detecting road conditions is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, obtaining images of a scene in front of the vehicle as detection images.

In one embodiment, an area in front of the vehicle (for example, a field of view) is photographed by a camera installed on the vehicle, and the photographed images are used as the detection images. In one embodiment, the camera is installed inside or outside the vehicle.

In one embodiment, the images obtained from a video of a driving recorder of the vehicle can also be used as the detection images by using an OpenCV technology. It should be noted that there is no specific limitation on the method of obtaining the detection images in present application.

At block 102, building a semantic segmentation model and training the semantic segmentation model.

Figure 2:
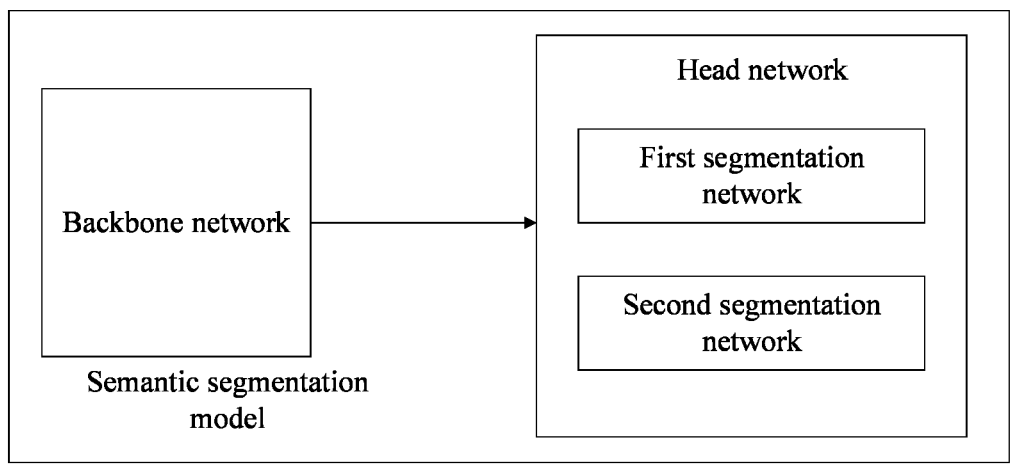
FIG. 2 is a schematic diagram of one embodiment of a semantic segmentation model of the method according to the present disclosure.

FIG. 2 illustrates the semantic segmentation model. In one embodiment, the semantic segmentation model includes a backbone network and a head network, wherein the head network includes a first segmentation network and a second segmentation network.

In one embodiment, training the semantic segmentation model includes: obtaining training images; inputting the training images into the backbone network for feature extraction and obtaining a number of training feature maps; inputting the number of the training feature maps into the head network, and processing each of the training feature maps by the first segmentation network, and obtaining a first training result of the training images; according to the first training result and a preset first expected result, using a preset loss function to calculate a first loss value of the first segmentation network; processing the number of the training feature maps by the second segmentation network, and obtaining a second training result of the training images; according to the second training result and the preset second expected result, using the preset loss function to calculate a second loss value of the second segmentation network; according to the first loss value and the second loss value, adjusting parameters of the semantic segmentation model and obtaining a trained semantic segmentation model.

In one embodiment, obtaining training images includes: using the images in a PASCAL Visual Object Classes (VOC) dataset as the training images, or using images in the cityscapes dataset as the training images, or using self-photographed images of road conditions as the training images. The present application does not specifically limit the training images, for example, images of various road scenes can be used as the training images, and the training images include different objects as detectable objects, such as vehicles, pedestrians, trees, roadblocks, etc.

In one embodiment, when using self-photographed images of the road conditions as the training images, the method includes: performing data enhancement processing on the self-photographed images of the road conditions to increase the number of the training images. The data enhancement processing includes flipping, rotating, scaling, and shifting the training images. In one embodiment, performing data enhancement processing on the training images can increase the number of the training images to improve a robustness of the semantic segmentation model.

In one embodiment, the inputting of the training images into the backbone network for feature extraction and obtaining a number of training feature maps includes: using an encoding network of the segnet network as the backbone network of the semantic segmentation model, and the encoding network of the segnet network includes a convolutional layer, a Batch Normalization (BN) layer, a ReLU activation layer, and a max-pooling layer; inputting the training images into the convolution layer to perform a convolution operation and extracting feature values of the training images, standardizing the feature values by the BN layer and calculating a current learning rate of the semantic segmentation model, and processing the feature values by the ReLU activation layer, the maximum pooling layer processing, and outputting the training feature maps.

In one embodiment, the inputting of the number of the training feature maps into the head network and processing each of the training feature maps by the first segmentation network and obtaining the first training result of the training images includes: using the decoding network of the segnet network as the first segmentation network in the head network of the semantic segmentation model, and the decoding layer network of the segnet network including an up-sampling layer, a convolution layer, and a first softmax layer; inputting the training feature maps to the up-sampling layer for up-sampling operation, enlarging the training feature maps to the same size as the training images, and then inputting up-sampled training feature maps to the convolutional layer for convolution operation and obtaining the first training feature maps after the convolution operation, and inputting the first training feature maps into the first softmax layer to classify the first training feature maps according to a first preset pixel categories, and obtaining a probability value $A_{ik}$ of pixel category of each of pixels in the training images, and the probability value $A_{ik}$ representing a probability value that the ith pixel in the training images is the kth pixel category; selecting a category with a maximum probability value as the pixel category of the pixel, outputting category information of each of pixels in the training images as the first training result, the category information including the pixel category of each of pixels in the training images, and determining the categories of all objects in the training images according to the category information to which each of the pixels belongs.

In one embodiment, the semantic segmentation model is trained based on the training images and corresponding pixel category annotations, and the pixel categories can be pre-determined. For example, the first preset pixel category predicted by the first softmax layer includes 19 predefined object categories, including vehicles, pedestrians, trees, roadblocks, street lights, buildings, etc. For example, the pixel categories include vehicles (k=0), pedestrians (k=1), trees (k=2), roadblocks (k=3), street lights (k=4), buildings (k=5), after the first softmax layer classifies the training images according to the first preset pixel categories, the probability values of the i-h pixel in one training image are obtained as $A_{i0}$=0.94、$A_{i1}$=0.23、$A_{i2}$=0.13、$A_{i3}$=0.03、$A_{i4}$=0.02、$A_{i5}$=0.01, and the maximum probability value is 0.94. Since k=0, it can be confirmed that the object type in the training image is a vehicle. Therefore, in this example, by calculating and comparing the probability value of the pixel category of the ith pixel, it can be determined that the ith pixel in the training image is a vehicle.

In one embodiment, the use of the preset loss function to calculate the first loss value of the first segmentation network includes using. LOSS=−(y log(ŷ)+(1−y)log(1−ŷ)) to calculate the first loss value of the first segmentation network, wherein LOSS represents the first loss value, y represents the preset first expected result, and ŷ represents the first training result.

In one embodiment, the processing of the number of the training feature maps by the second segmentation network and obtaining the second training result of the training images includes: adding a new decoding network of the segnet network as the second segmentation network in the head network of the semantic segmentation model, and the decoding layer network of the new segnet network includes an up-sampling layer, a convolution layer, and a second softmax layer; inputting the number of the training feature maps to the up-sampling layer for an up-sampling operation, enlarging the training feature maps to the same size as the training images, and then inputting the up-sampled training feature maps to the convolutional layer for convolution operation, and obtaining the second training feature maps; inputting the second training feature maps into the second softmax layer for classification according to the second preset pixel categories, and obtaining a probability value $A_{bq}$ of each of pixels in the training images, the probability value $A_{bq}$ representing a probability that the bth pixel in the training images is the bth pixel category; selecting a pixel category of one pixel with the maximum probability value as the pixel category, according to the pixel category, determining a road category of the training images as the second training result, and outputting the second training result.

In one embodiment, the second preset pixel category includes two predefined road categories: lane and non-lane. For example, the second softmax layer predicts the road category in the training images as the lane or the non-lane of the roadway. For example, the pixel category includes lanes (q=10) and non-lanes (q=15). After the second softmax layer classifies the training feature maps according to the second preset pixel category, the probability values of the bth pixel in one training image is obtained as $A_{b10}$=0.86, $A_{b15}$=0.33, and the maximum probability value is 0.86. Since the q=10, it can be determined that the pixel is within the lane. Therefore, in this example, by calculating and comparing the probability value of the bth pixel category, it can be obtained that the road category of the bth pixel is within the lane. In one embodiment, when the object in the training image is identified as within the lane, it indicates that the object is not an obstacle; when the object in the training image is identified as non-lane, it indicates that the object is an obstacle outside a lane.

In one embodiment, using the preset loss function to calculate the second loss value of the second segmentation network is similar to the method of using the preset loss function to calculate the first loss value of the first segmentation network, the present application will not repeat them here.

In one embodiment, the adjustment of the parameters of the semantic segmentation model and obtaining the trained semantic segmentation model includes: adding the first loss value and the second loss value and obtaining the loss value of the semantic segmentation model; adjusting the parameters of the semantic segmentation model by a gradient descent method, minimizing the loss value of the semantic segmentation model and obtaining the trained semantic segmentation model.

In one embodiment, the gradient descent algorithms include a Stochastic Gradient Descent or a Mini-batch Gradient Descent. In one embodiment, adjusting the parameters of the semantic segmentation model includes adjusting the learning rate of the semantic segmentation model or iterative training times of the training images.

At block 103, inputting the detection images into the backbone network in the trained semantic segmentation model for feature extraction and obtaining the feature maps.

In one embodiment, the electronic device inputs the detection images into the convolution layer in the backbone network and performs convolution operation to extract the feature values of the detection image, standardizes the feature values by the BN layer to calculate the current learning rate, and processes the feature values by the ReLU activation layer, the maximum pooling layer, and outputs the number of the feature maps.

At block 104, inputting the feature maps into the head network, processing the number of the feature maps by the first segmentation network of the head network, and outputting a first recognition result.

Figure 3:
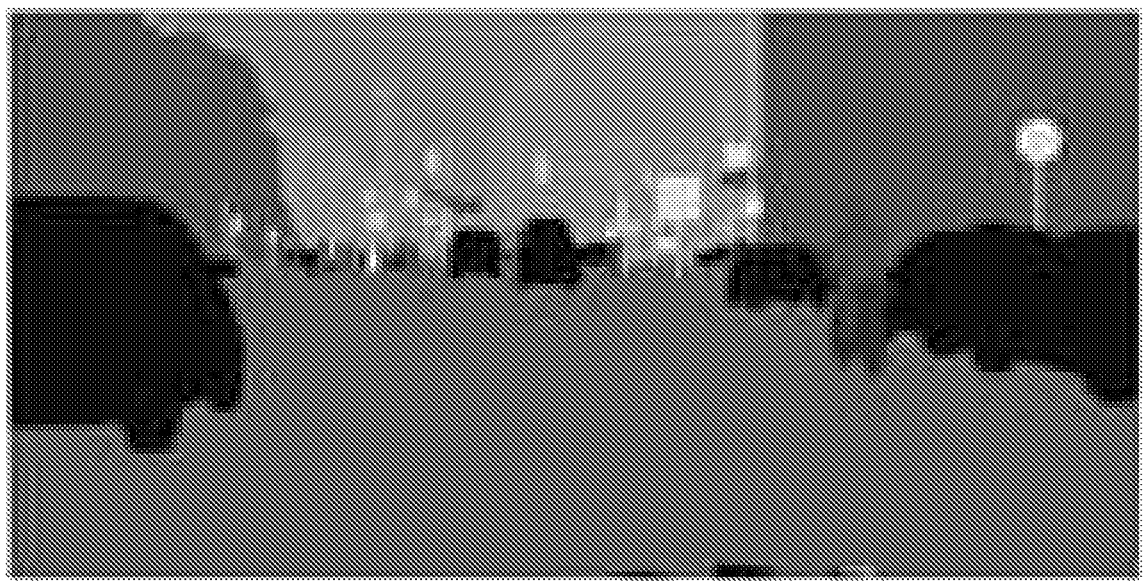
FIG. 3 is a schematic diagram of one embodiment of a first recognition result of the method according to the present disclosure.

In one embodiment, the electronic device inputs the detection images into the backbone network, performs convolution operation and maximum pooling operation on the detection images, and obtains the feature maps of the detection images. Further, the electronic device performs up-sampling operation and deconvolution operation on the number of the feature maps by the first segmentation network, and obtains the feature maps with the same size as the detection images. Further, the electronic device uses the first softmax layer to classify the number of the feature maps according to the first preset pixel category, and outputs the category information of each of the pixels in the detection images. The electronic device determines categories of all objects in the detection images according to the category information, and the categories of all objects in the detection images are used as the first recognition result. FIG. 3 illustrates the first recognition result. In one embodiment, the recognition result of the detection images is obtained by the first segmentation network, and the object categories in the detection images are classified by pixels, and the object categories in the detection images are obtained.

At block 105, processing the number of the feature maps by the second segmentation network of the head network and outputting a second recognition result.

Figure 4:
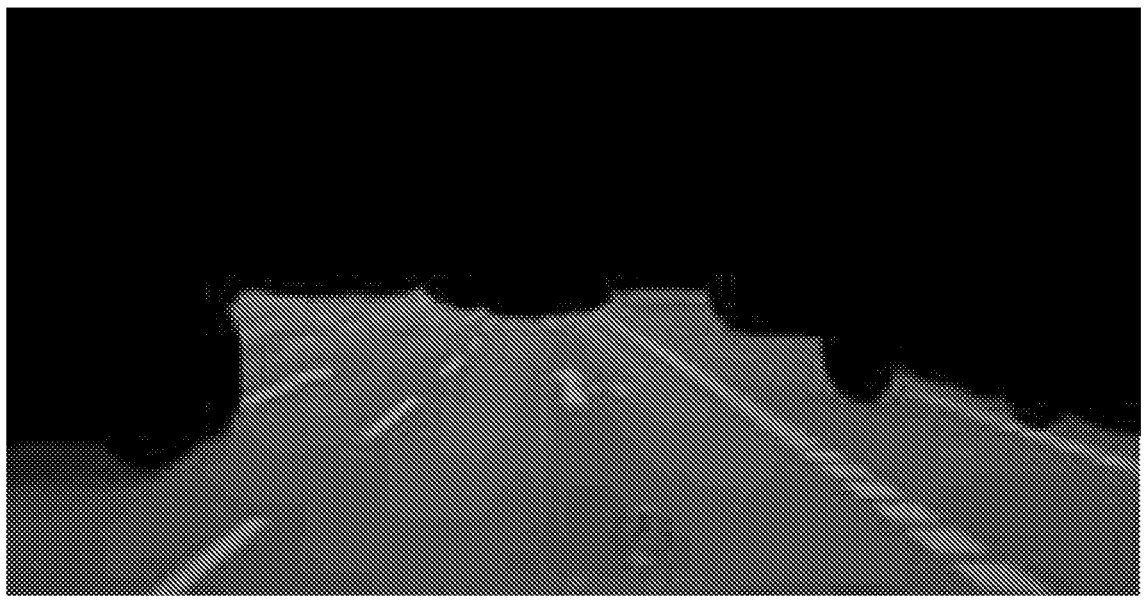
FIG. 4 is a schematic diagram of one embodiment of a second recognition result of the method according to the present disclosure.

In one embodiment, the processing of the feature maps of the second segmentation network of the head network and outputting a second recognition result includes: performing up-sampling operation and deconvolution operation on the feature maps by the second segmentation network, obtaining feature maps with the same size as the detection images; using the second softmax layer to classify the number of the feature maps according to the second preset pixel category, and determining the road category of the detection images as the second recognition result. In one embodiment, the road category includes the lane and the non-lane. FIG. 4 illustrates the second recognition result. In one embodiment, the recognition result of the detection image is obtained by the second segmentation network, and the object categories in the detection images are classified by pixels, and the road category of the detection image is determined. In one embodiment, the lane is regarded as not obstructed, and the non-lane is regarded as obstructed.

The above-mentioned acquisition process of the first recognition result can refer to the above-mentioned acquisition process of the first training result. Similarly, the acquisition process of the second recognition result can refer to the acquisition process of the second training result above.

It should be noted that, the first segmentation network and the second segmentation network process the feature maps at the same time. When the first segmentation network obtains the first recognition result, a recognized category is classified to determine a next operation of the vehicle, and when the first recognition result shows an unrecognized category, the second recognition result is invoked, and the second recognition result is used to determine the next operation of the vehicle.

At block 106, determining whether the vehicle can continue to drive according to the first recognition result and the second recognition result.

In one embodiment, determining whether the vehicle can continue to drive according to the first recognition result and the second recognition result includes: when the first recognition result indicates that the categories of all objects in the detection images have been identified, determining whether the vehicle is allowed to continue driving according to objects in all categories in the first identification result; when the first recognition result indicates that there is an unrecognizable object in the detection images and the second recognition result indicates that the road category is a lane, it is considered that there is no obstacle in front of the vehicle, and that the vehicle is allowed to continue driving;

or when the first recognition result indicates that there are unrecognizable objects in the detection images and the second recognition result indicates that the road category is a non-lane, it is considered that there is an obstacle in front of the vehicle, that the vehicle is not allowed to continue driving.

In one embodiment, when the first recognition result is obtained by the first segmentation network and the first recognition result cannot recognize the object category, the second recognition result is used to determine whether the vehicle can continue to drive. For example, if there is a pedestrian in front of the vehicle, and the category of the pedestrian is not included in the training of the first segmentation network, the first segmentation network cannot identify the pedestrian in front of the vehicle, and the second recognition result is used to determine whether the vehicle can continue to drive. When the second recognition result indicates that the road category is non-lane, and it is considered that there is an obstacle in front of the vehicle, and it is determined that the vehicle cannot continue to drive.

The above embodiments are only specific embodiments of the present application, but a protection scope of the present application is not limited to these. For those of ordinary skill in the art, improvements can be made without departing from the inventive concept of the present application, but these all belong to the protection scope of the present application.

Figure 5:
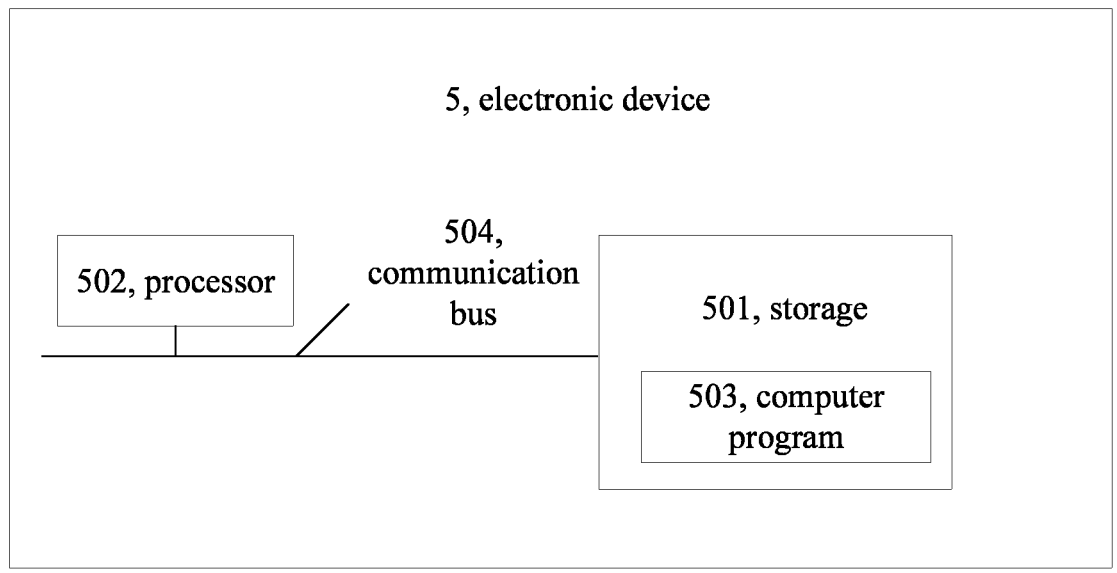
FIG. 5 is a schematic diagram of one embodiment of an electronic device employing the method according to the present disclosure.

FIG. 5 illustrates the electronic device 5. The electronic device 5 includes a storage 501, a processor 502, a computer program 503 stored in the storage 501, and at least one communication bus 504. In one embodiment, electronic device 5 can be an in-vehicle device. The in-vehicle device is provided on a vehicle, and the in-vehicle device may be an in-vehicle computer.

Those skilled in the art can understand that FIG. 5 shows only an example of the electronic device 5, and does not constitute a limitation on the electronic device 5. Other examples may include more or less components than those shown in the drawings, or have different combinations of components, or different components, for example, the electronic device 5 may also include input and output devices, network access devices, and the like.

The at least one processor 502 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The at least one processor 502 can be a microprocessor or the at least one processor 502 can also be any conventional processor, etc. The at least one processor 502 is the control center of the electronic device 5, using various interfaces and lines to connect various parts of the entire electronic device 5.

The storage 501 can be used to store the computer program 503, and the at least one processor 502 implements the electronic program by executing the computer program 503 stored in the storage 501 and calling up the data stored in the storage 501. The storage 501 may include a stored program area and a stored data area, wherein the stored program area may store an operating system, an application program required for at least one function (such as a sound playback function, an image playback function, etc.), etc. The storage data area may store data (such as audio data) created according to the use of the electronic device 5, etc. In addition, the storage 501 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

In one embodiment, the modules/units integrated in the electronic device 5 can be stored in a computer readable storage medium if such modules/units are implemented in the form of an independent product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM).

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for detecting road conditions comprising:
   obtaining images of a scene in front of a vehicle as detection images;
   inputting the detection images into a trained semantic segmentation model, the trained semantic segmentation model comprising a backbone network and a head network;
   inputting the detection images into the backbone network to extract features and obtain a plurality of feature maps;
   inputting the plurality of the feature maps into the head network, processing the plurality of the feature maps by a first segmentation network of the head network, and outputting a first recognition result;
   processing the plurality of the feature maps by a second segmentation network of the head network, and outputting a second recognition result;
   determining driving operations of the vehicle according to the first recognition result and the second recognition result.

2. The method as claimed in claim 1, further comprising:
   building a semantic segmentation model, training the semantic segmentation model, and obtaining the trained semantic segmentation model.

3. The method as claimed in claim 2, further comprising:
   obtaining training images;
   inputting the training images into the backbone network to extract features and obtain a plurality of training feature maps;
   inputting the plurality of the training feature maps into the head network, and processing each of the plurality of the training feature maps by the first segmentation network, and obtaining a first training result of the training images;

according to the first training result and a preset first expected result, calculating a first loss value of the first segmentation network by using a preset loss function;

processing the plurality of the training feature maps by the second segmentation network, and obtaining a second training result of the training images;

according to the second training result and a preset second expected result, calculating a second loss value of the second segmentation network by using the preset loss function;

according to the first loss value and the second loss value, adjusting parameters of the semantic segmentation model and obtaining the trained semantic segmentation model.

4. The method as claimed in claim 3, further comprising:
performing up-sampling operation and deconvolution operation on the plurality of the training feature maps by using the first segmentation network in the head network, obtaining first training feature maps, wherein each of the first training feature maps and a corresponding one of the training images have a same size;

inputting the first training feature maps into a first softmax layer, classifying the first training feature maps according to a first preset pixel categories, and obtaining probability values of pixel category of each pixel in the training images;

selecting a pixel category of one pixel with a maximum probability value as the pixel category of the pixel, outputting category information of each of pixels in the training images as the first training result, wherein the category information comprises the pixel category of each of pixels in the training images.

5. The method as claimed in claim 3, further comprising:
performing up-sampling operation and deconvolution operation on the plurality of the training feature maps by using the second segmentation network in the head network, obtaining second training feature maps, wherein each of the second training feature maps and a corresponding one of the training images have a same size;

inputting the second training feature maps into a second softmax layer, and classifying the second training feature maps according to a second preset pixel categories, and obtaining probability values of pixel category of each pixel in the training images;

selecting a pixel category of one pixel with a maximum probability value as the pixel category of the pixel, determining a road category of the training images as the second training result, and outputting the second training result.

6. The method as claimed in claim 3, further comprising:
adding the first loss value and the second loss value and obtaining a loss value of the semantic segmentation model;

adjusting the parameters of the semantic segmentation model by a gradient descent method, minimizing the loss value of the semantic segmentation model and obtaining the trained semantic segmentation model.

7. The method as claimed in claim 1, further comprising:
determining an encoding network of a segnet network as the backbone network;

determining a decoding network of the segnet network as the head network of the first segmentation network;

adding a new decoding network of the segnet network as the second segmentation network in the head network.

8. The method as claimed in claim 7, further comprising:
inputting the detection images into the backbone network, performing a convolution operation and a maximum pooling operation on the detection images, and obtaining the plurality of the feature maps of the detection images;

performing an up-sampling operation and a deconvolution operation on the plurality of the feature maps by the first segmentation network, and obtaining the plurality of the feature maps with the same size as the detection images;

classifying the plurality of the feature maps according to a first preset pixel category by using a first softmax layer, and outputting category information of each of pixels in the detection images;

determining categories of all objects in the detection images according to the category information, and determining the categories of all objects in the detection images as the first recognition result.

9. The method as claimed in claim 7, further comprising:
performing an up-sampling operation and a deconvolution operation on a plurality of the feature maps by the second segmentation network, obtaining the plurality of the feature maps, wherein each of the feature maps and a corresponding one of the detection images have a same size;

classifying the plurality of the feature maps according to a second preset pixel category by using a second softmax layer, and determining the road category of the detection images as the second recognition result.

10. The method as claimed in claim 9, further comprising:
in response that the first recognition result indicates that the categories of all objects in the detection images have been identified, determining whether the vehicle is allowed to continue driving according to the categories of all objects in the first identification result;

in response that the first recognition result indicates that there is an unrecognizable object in the detection images and the second recognition result indicates that the road category is a lane, determining that the vehicle is allowed to continue driving;

in response that the first recognition result indicates that there is the unrecognizable object in the detection images and the second recognition result indicates that the road category is a non-lane, determining that the vehicle is not allowed to continue driving.

11. An electronic device comprising:
a processor; and
a non-transitory storage medium coupled to the processor and configured to store a plurality of instructions, which cause the processor to:
obtain images of a scene in front of a vehicle as detection images;
input the detection images into a trained semantic segmentation model, the trained semantic segmentation model comprising a backbone network and a head network;
input the detection images into the backbone network to extract features and obtain a plurality of feature maps;
input the plurality of the feature maps into the head network, process the plurality of the feature maps by a first segmentation network of the head network, and output a first recognition result;
process the plurality of the feature maps by a second segmentation network of the head network, and output a second recognition result;

determining driving operations of the vehicle according to the first recognition result and the second recognition result.

12. The electronic device as claimed in claim 11, wherein the plurality of instructions are further configured to cause the processor to:
build a semantic segmentation model, train the semantic segmentation model, and obtain the trained semantic segmentation model.

13. The electronic device as claimed in claim 12, wherein the plurality of instructions are further configured to cause the processor to:
obtain training images;
input the training images into the backbone network to extract features and obtain a plurality of training feature maps;
input the plurality of the training feature maps into the head network, and process each of the plurality of the training feature maps by the first segmentation network, and obtain a first training result of the training images;
according to the first training result and a preset first expected result, calculate a first loss value of the first segmentation network by using a preset loss function;
process the plurality of the training feature maps by the second segmentation network, and obtain a second training result of the training images;
according to the second training result and a preset second expected result, calculating a second loss value of the second segmentation network by using the preset loss function;
according to the first loss value and the second loss value, adjust parameters of the semantic segmentation model and obtain the trained semantic segmentation model.

14. The electronic device as claimed in claim 13, wherein the plurality of instructions are further configured to cause the processor to:
perform up-sampling operation and deconvolution operation on the plurality of the training feature maps by using the first segmentation network in the head network, obtain first training feature maps, wherein each of the first training feature maps and a corresponding one of the training images have a same size;
input the first training feature maps into a first softmax layer, classify the first training feature maps according to a first preset pixel categories, and obtain probability values of pixel category of each pixel in the training images;
select a pixel category of one pixel with a maximum probability value as the pixel category of the pixel, output category information of each of pixels in the training images as the first training result, wherein the category information comprises the pixel category of each of pixels in the training images.

15. The electronic device as claimed in claim 13, wherein the plurality of instructions are further configured to cause the processor to:
perform up-sampling operation and deconvolution operation on the plurality of the training feature maps by using the second segmentation network in the head network, obtain second training feature maps, wherein each of the second training feature maps and a corresponding one of the training images have a same size;
input the second training feature maps into a second softmax layer to classify the second training feature maps according to a second preset pixel categories, and obtain probability values of pixel category of each pixel in the training images;
select a pixel category of one pixel with a maximum probability value as the pixel category of the pixel, determine a road category of the training images as the second training result, and output the second training result.

16. The electronic device as claimed in claim 13, wherein the plurality of instructions are further configured to cause the processor to:
add the first loss value and the second loss value and obtaining a loss value of the semantic segmentation model;
adjust the parameters of the semantic segmentation model by a gradient descent method, minimize the loss value of the semantic segmentation model and obtain the trained semantic segmentation model.

17. The electronic device as claimed in claim 11, wherein the plurality of instructions are further configured to cause the processor to:
determine an encoding network of a segnet network as the backbone network;
determine a decoding network of the segnet network as the head network of the first segmentation network;
add a new decoding network of the segnet network as the second segmentation network in the head network.

18. The electronic device as claimed in claim 17, wherein the plurality of instructions are further configured to cause the processor to:
input the detection images into the backbone network, performing a convolution operation and a maximum pooling operation on the detection images, and obtain the plurality of the feature maps of the detection images;
perform an up-sampling operation and a deconvolution operation on the plurality of the feature maps by the first segmentation network, and obtain the plurality of the feature maps with the same size as the detection images;
classify the plurality of the feature maps according to a first preset pixel category by using a first softmax layer, and output category information of each of pixels in the detection images;
determine categories of all objects in the detection images according to the category information, and determine the categories of all objects in the detection images as the first recognition result.

19. The electronic device as claimed in claim 17, wherein the plurality of instructions are further configured to cause the processor to:
perform an up-sampling operation and a deconvolution operation on a plurality of the feature maps by the second segmentation network, obtain the plurality of the feature maps, wherein each of the feature maps and a corresponding one of the detection images have a same size;
classifying the plurality of the feature maps according to a second preset pixel category by using a second softmax layer, and determine the road category of the detection images as the second recognition result.

20. The electronic device as claimed in claim 19, wherein the plurality of instructions are further configured to cause the processor to:
in response that the first recognition result indicates that the categories of all objects in the detection images have been identified, determine whether the vehicle is allowed to continue driving according to the categories of all objects in the first identification result;

in response that the first recognition result indicates that there is an unrecognizable object in the detection images and the second recognition result indicates that the road category is a lane, determine that the vehicle is allowed to continue driving;

in response that the first recognition result indicates that there is the unrecognizable object in the detection images and the second recognition result indicates that the road category is a non-lane, determine that the vehicle is not allowed to continue driving.

* * * * *